United States Patent Office 3,833,545
Patented Sept. 3, 1974

---

3,833,545
FLUORINE-CONTAINING POLYURETHANES
Boris Ruvimovich Livshits, Volgorgradsky prospekt 159, korpus 2, kv. 66; Tamara Khaimovna Dymshits, Maly Levshinsky pereulok 7, kv. 39; Sveltlana Vasilievna Vinogradova, Belyaevo Bogorodskoe kvartal 48A, korpus 6AB, kv. 63; and Ivan Ljudvigovich Knunyants, Kotelnicheskaya 1/15, kv. 336, all of Moscow, U.S.S.R.
No Drawing. Continuation of abandoned application Ser. No. 136,243, Apr. 21, 1971. This application Aug. 15, 1973, Ser. No. 388,410
Int. Cl. C08g 22/04
U.S. Cl. 260—47 CB                                             1 Claim

ABSTRACT OF THE DISCLOSURE

A method of preparing fluorine-containing polyurethanes which comprise recurring units represented by the structural formula

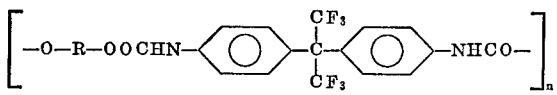

wherein R represents a divalent residue of either glycols, hydroxyl-containing polyesters, bisphenols or fluorine-containing derivatives of said compounds and have degree of polymerization $n=7-20$, characterized in that they are products of the reaction of either glycols, hydroxyl-containing polyesters, bisphenols or fluorine-containing derivatives of said compounds with hexafluoroisopropylidene-p,p'-diphenyldiisocyanate represented by the formula

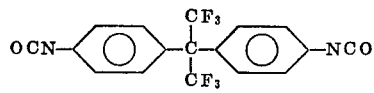

in organic media at a temperature ranging from 20 to 150° C. at a molar ratio said hydroxyl-containing reagents to diisocyanate equal to 1:1–1.5 respectively.

The proposed fluorine-containing polyurethanes, while preserving the properties inherent to conventional polyurethanes (high adhesion and cohesion, elasticity, wear-resistance, frost-resistance) are characterized in high hydrolytic stability and enhanced thermal stability.

---

This is a continuation of application Ser. No. 136,243, filed Apr. 21, 1971, and now abandoned.

The invention relates to polymer materials, namely fluorine-containing polyurethanes and methods for preparing them.

The above-mentioned materials are intended for producing on their basis foam plastics, adhesive, lacquers, sealing compounds, etc. The known fluorine-containing polyurethanes are products of interaction of either glycols, hydroxyl-containing polyesters, bisphenols or fluorine-containing derivatives of said compounds with fluorine-containing aliphatic diisocyanates or aromatic diisocyanates fluorinated in their nuclei.

There are also some known methods for preparing said polyurethanes by interaction between hydroxyl-containing components and fluorine-containing diisocyanates mentioned above in organic media in a temperature range of about 20 to 150° C. A disadvantage of the known fluorine-containing polyurethanes is their low thermal stability as well as insufficient hydrolytic stability. Many of the known fluorine-containing polyurethanes are liable to low-temperature destruction with the evolution of hydrogen fluoride.

The object of the present invention is to elaborate a new type of fluorine-containing polyurethanes which, while preserving the properties inherent to conventional polyurethanes (high adhesion and cohesion, elasticity, wear-resistance, frost-resistance) would be characterized by high hydrolytic stability and enhanced thermal stability, so that such fluorine-containing polyurethanes could be listed among thermostable polymers.

In accordance with said and other objects the invention consists in that fluorine-containing polyurethanes are proposed which are products of interaction of either glycols, hydroxyl-containing polyesters, bisphenols or fluorine-containing derivatives of said compounds with fluorine-containing diisocyanate. According to the invention the proposed polyurethanes are polymers, which comprise recurring units represented by the structural formula

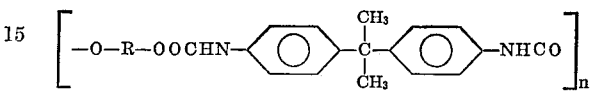

wherein R represents a divalent residue of either glycols, hydroxyl-containing polyesters, bisphenols or fluorine-containing derivatives of said compounds and have degree of polymerization $n=7-20$.

Said fluorine-containing polyurethanes may be prepared by a method consisting in reacting either glycols, hydroxyl-containing polyesters, bisphenols or fluorine-containing derivatives of said compounds with fluorine-containing diisocyanate in an organic solvent in a temperature range of about 20 to 150° C. According to the invention hexafluoroisopropylidene - p,p' - diphenyldiisocyanate represented by the formula

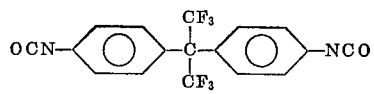

is used as a fluorine-containing diisocyanate, the process being accomplished with the ratio of 1–1.5 mole of diisocyanate per mole of the hydroxyl-containing reagent.

Introducing fluorine atoms into the polyurethane molecule brings about a considerable change in the strength of the urethane bond, the position of the fluorine atoms relative to the urethane bond being decisive. When the diisocyanate of the above formula is used to synthesize polyurethanes, the amount of the fluorine atoms in the macromolecule becomes sufficient for a considerable strengthening of the urethane bond. Electronegative substituents in the molecule of the diisocyanate increase a partial positive charge on the carbon atom of the isocyanate group that facilitates the attack of this atom by the nucleophilic reagent and hence increases the rate of formation of the polyurethane. The presence of fluorine atoms in the side substituents at the central carbon atoms in the molecule of said diisocyanate so that fluorine atoms are spaced from the isocyanate group excludes a possibility of an excessive increase of the reactivity of these groups and thus minimize those technological difficulties which arise in the industrial application of fluorine-containing diisocyanates.

The polyurethanes prepared in accordance with present invention surpass both non-fluorinated analogues and the known fluorine-containing polyurethanes in their thermal stability and physico-mechanical properties. Possibility of producing high-molecular polymers and their enhanced solubility in a number of organic solvents considerably widen the applicability of such polyurethanes.

The preparation of the proposed fluorine-containing polyurethanes is accomplished, as mentioned above, in organic media. Such anhydrous inert solvents as, for example, dimethyl-sulphone, cyclohexanone and, preferably, dimethylsulphoxide may be used. Synthesis is accomplished at a temperature ranging from 20 to 150° C., depending on the nature of the starting reagents. Suitable hydroxyl-containing reagents are, for example, 2,2-bis-(p- hydroxyphenyl)propane; 2,2 - bis - (p - hydroxyphenyl)-hexafluoropropane; ethylene glycol; diethylene glycol; α,α,ω,ω-tetrahydrohexafluoropentadiol; polyester, prepared through esterification of adipic and phthalic acids with glycerol and diethylene glycol; polyester, prepared through esterification of perfluoroadipic and phthalic acids with a mixture of glycerol and ethylene glycol or a mixture of glycerol and α,α,ω,ω-tetrahydrohexafluoropentadiol.

For a better understanding of the present invention given hereinbelow are illustrative examples of producing the proposed fluorine-containing polyurethanes.

EXAMPLE 1

A solution of 1 mole of ethylene glycol in 100 ml. of dry dimethylsulphoxide (DMSO) was added at room temperature with stirring to 1 mole of hexafluoroisopropylidene-p,p-diphenyldiisocyanate (HFDI) in 300 ml. of DMSO. The mixture was heated at 110° C. under stirring for 2 hours, DMSO was then added to lower the concentration to 5 percent. The mixture was poured into water, the precipitated polymer was collected, washed with water, reprecipitated from acetone, collected, washed with water and dried at 100° C.

The yield of polymer was 85 percent of the theoretical; $\eta_{inh}$=0.7 dl./g. (in dimethylformamide at 25° C.); the softening point 285° C.; the temperature of the commencement weight losses under heating in air according to thermogravimetry (TGA) is 300° C. The polymer features an unlimited solubility in acetone, cyclohexanone, dimethylformamide, dimethylsulphoxide and forms durable and elastic films (see Table 1).

EXAMPLE 2

The synthesis of the fluorine-containing polymer was accomplished as described in Example 1, with the exception that the temperature of synthesis was 60° C. and duration of the process was 3.5 hours.

The yield of polymer was 70% of the theoretical; $\eta_{inh}$=0.60 dl./g. (in dimethylformamide at 25° C.). Other characteristics of the polymer were same as in Example 1. Properties of free films formed by the polymer are given in Table 1.

EXAMPLE 3

The synthesis of the polymer was accomplished as described in Example 1, the difference being that the temperature of synthesis was 150° C. and duration of the process was 40 minutes.

The yield of polymer was 80% of the theoretical; $\eta_{inh}$=0.80 dl./g. (in dimethylformamide at 25° C.). Other characteristics of the polymer were the same as in Example 1. Properties of free films formed by the polymer, are given in Table 1.

EXAMPLE 4

The polymer was prepared from 1 mole of HFDI and 1 mole of diethylene glycol as described in Example 1.

The yield of polymer was 82% of the theoretical; $\eta_{inh}$=0.87 dl./g. the softening point 273° C.; the temperature of the commencement weight losses under heating in air according to TGA is 309° C. The polymer is unlimitedly soluble in solvents, mentioned in Example 1. The properties of free films, formed by the polymer, are given in Table 1.

EXAMPLE 5

The polymer was prepared from 1 mole of HFDI and 1 mole of diethylene glycol under the same conditions as in Example 2.

The yield of polymer was 75% of the theoretical; $\eta_{inh}$=0.65 dl./g.; the softening point 250° C.; the temperature of the commencement weight losses under heating in air according to TGA is 300° C. The polymer is unlimitedly soluble in solvents mentioned in Example 1. The properties of free films formed by the polymer are given in Table 1.

EXAMPLE 6

The polymer was prepared from 1 mole of HFDI and 1 mole of diethylene glycol under the conditions described in Example 3.

The yield of polymer was 80% of the theoretical; $\eta_{inh}$=1.1 dl./g. (in dimethylformamide at 25° C.); the softening point 310° C.; the temperature of the commencement weight losses under heating in air according to TGA is 320° C. The polymer is unlimitedly soluble in solvents mentioned in Example 1. The properties of free films, formed by the polymer, are given in Table 1.

EXAMPLE 7

The polymer was synthesized from 1 mole of HFDI and 1 mole of α,α,ω,ω-tetrahydrohexafluoropentadiol in conditions described in Example 1.

The yield of polymer was 71% of the theoretical; $\eta_{inh}$=0.43 dl./g. (in dimethylformamide at 25° C.); the softening point 177° C.; the temperature of the commencement weight losses under heating in air according to TGA was about 200° C. The polymer is unlimitedly soluble in acetone, cyclohexanone, dimethylformamide, dimethylsulphoxide and forms durable and elastic films from these solutions (see Table 1).

EXAMPLE 8

The polymer was prepared from 1 mole of HFDI and 1 mole of 2,2-bis-(p-hydroxyphenyl)-propane as described in Example 1.

The yield of the polymer was 87% of the theoretical; $\eta_{inh}$=0.62 dl./g.; the softening point 205° C.; the temperature of the commencement weight losses under heating in air according to TGA was about 220° C. The polymer is readily soluble in solvents mentioned in Example 1. The properties of free films, formed by the polymer, are given in Table 1.

EXAMPLE 9

The polymer was prepared from 1 mole HFDI and 1 mole of 2,2-bis-(p-hydroxyphenyl-hexafluoropropane as described in Example 1.

The yield of the polymer was 78% of the theoretical; $\eta_{inh}$=0.58 dl./g.; the softening point 206° C.; the temperature of the commencement weight losses under heating in air according to TGA is about 220° C. The polymer is readily soluble in solvents mentioned in Example 1. The properties of free films formed by the polymer are given in Table 1.

EXAMPLE 10

1 mole of HFDI was dissolved in 1 l. of cyclohexanone and mixed at room temperature with 20% cyclohexanone solution of a polyester based upon adipic and phathalic acids, diethylene glycol and glycerol (molecular weight 800, hydroxyl number 300 mg. KOH/g., acid number 4 mg. KOH/g.). The proportion of diisocyanate and polyester in the reaction mixture was in accordance with the molar ratio NCO:OH=1.4:1. The resulting solution was applied onto a steel backing and dried at 120° C. for 1 hour. The properties of protective films, formed by the polymer, are given in Table 3.

EXAMPLE 11

1 mole of HFDI was dissolved in 1 l. of cyclohexanone and mixed at room temperature with 20% cyclohexanone solution of a polyester based upon adipic and phthalic acids, glycerol and α,α,ω,ω-tetrahydrohexafluoropentadiol (molecular weight 550, hydroxy number 400 mg. KOH/g., acid number 3 mg. KOH/g.). The proportions of diisocyanate and polyester in the reaction mixture was in accordance with the molar ratio NCO:OH=1.5:1. The resulting solution was applied onto a steel backing and dried at 120° C. for 1 hour. The properties of protective films, formed by the polymer, are given in Table 3.

TABLE 1.—THE PROPERTIES OF FREE POLYURETHANE FILMS

| Number of examples | Recurring unit of polyurethane | 20° C. $\beta$ | 20° C. $\epsilon$ | 100° C. $\beta$ | 100° C. $\epsilon$ | 150° C. $\beta$ | 150° C. $\epsilon$ | 200° C. $\beta$ | 200° C. $\epsilon$ | 250° C. $\beta$ | 250° C. $\epsilon$ |
|---|---|---|---|---|---|---|---|---|---|---|---|
| 1, 2, 3 | —OCHN—$C_6H_4$—$C(CF_3)_2$—$C_6H_4$—NHCOO$(CH_2)_2$—O— | 610 | 30 | 510 | 52 | 470 | 68 | 310 | 87 | 220 | 190 |
| 4, 5, 6 | —OCHN—$C_6H_4$—$C(CF_3)_2$—$C_6H_4$—NHCOO$(CH_2)_2$—O$(CH_2)_2$O— | 580 | 34 | 440 | 58 | 340 | 75 | 220 | 112 | 170 | 210 |
| 8 | —OCHN—$C_6H_4$—$C(CF_3)_2$—$C_6H_4$—NHCOO—$C_6H_4C(CH_3)_2$—$C_6H_4$O— | 530 | 28 | 210 | 72 | | | | | | |
| 9 | —OCHN—$C_6H_4C(CF_3)_2C_6H_4$—NHCOO—$C_6H_4C(CF_3)_2$—$C_6H_4$O— | 480 | 21 | 180 | 89 | | | | | | |
| 11 | —OCHN—$C_6H_4C(CF_3)_2C_6H_4$—NHCOO—$CH_2(CF_2)_3CH_2$O— | 400 | 52 | 310 | 95 | 140 | 280 | | | | |

NOTE.—$\beta$=Ultimate tensile strength, kg./cm.$^2$  $\epsilon$=Relative elongation, percent.

Characteristics of strength of free films formed by the polymer prepared from methylene-p,p'-diphenyldiisocyanate and diethylene glycol (recurring unit of the polymer is represented by the formula

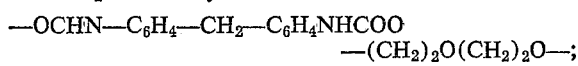

$\eta_{inh}$=0.65 dl./g. in dimethylformamide at 25° C.) are cited in Table 2 for comparison.

TABLE 2

| Characteristics of strength of free polyurethane films | 20° C. | 100° C. | 150° C. | 200° C. | 250° C. |
|---|---|---|---|---|---|
| Ultimate tensile strength, kg./cm.$^2$ | 480 | 350 | 280 | Melts | |
| Relative elongation, percent | 25 | 42 | 67 | ...do | |

TABLE 3.—MECHANICAL PROPERTIES OF 30-MC. THICK PROTECTIVE POLYURETHANE VARNISH FILMS

| Kind of test | Polyurethane (starting compounds) | | |
|---|---|---|---|
| | HFDI and polyester (Example 150) | HFDI and fluorine-containing polyester (Example 11) | Methylene-p,p-diphenyldiisocyanate and polyester from Example 10 (as reference specimen) |
| Blow test (straight/reverse) conventional units | 50/50 | 50/50 | 50/50 |
| Blow test (straight/reverse) after heating at 200° C. for 300 hours, conventional units | 50/50 | 30/20 | 20/20 |
| Hardness, relative units | 0.88 | 0.72 | 0.6 |
| Specific loss of weight under loading of 2 kg., mg./m·cm.$^2$ | 1.9 | 2.5 | ~3.0 |

What is claimed is:

1. Fluorine-containing polyurethanes, produced by the reaction of hydroxyl-containing compounds and fluorine-containing diisocyanates; said polymers consisting essentially of recurring units represented by the structural formula:

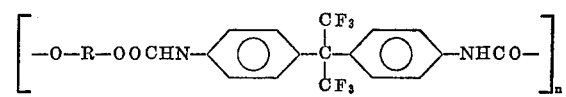

wherein R represents a hydroxy-free divalent radical of a member of the group consisting of glycols, hydroxyl-containing polyesters, 2,2-bis-(p-hydroxyphenyl)propane, and 2,2-bis-(p-hydroxyphenyl)hexafluoropropane; and $n$ is an integer from 7 to 20.

References Cited
UNITED STATES PATENTS 2,284,637   6/1942   Catlin _____ 260—2
3,463,762   8/1969   Trischler _____ 260—77.5

LESTER L. LEE, Primary Examiner

U.S. Cl. X.R.

260—30.8 DS, 32.6 N, 32.8 N, 75 NK, 77.5 AP